Patented Apr. 25, 1933

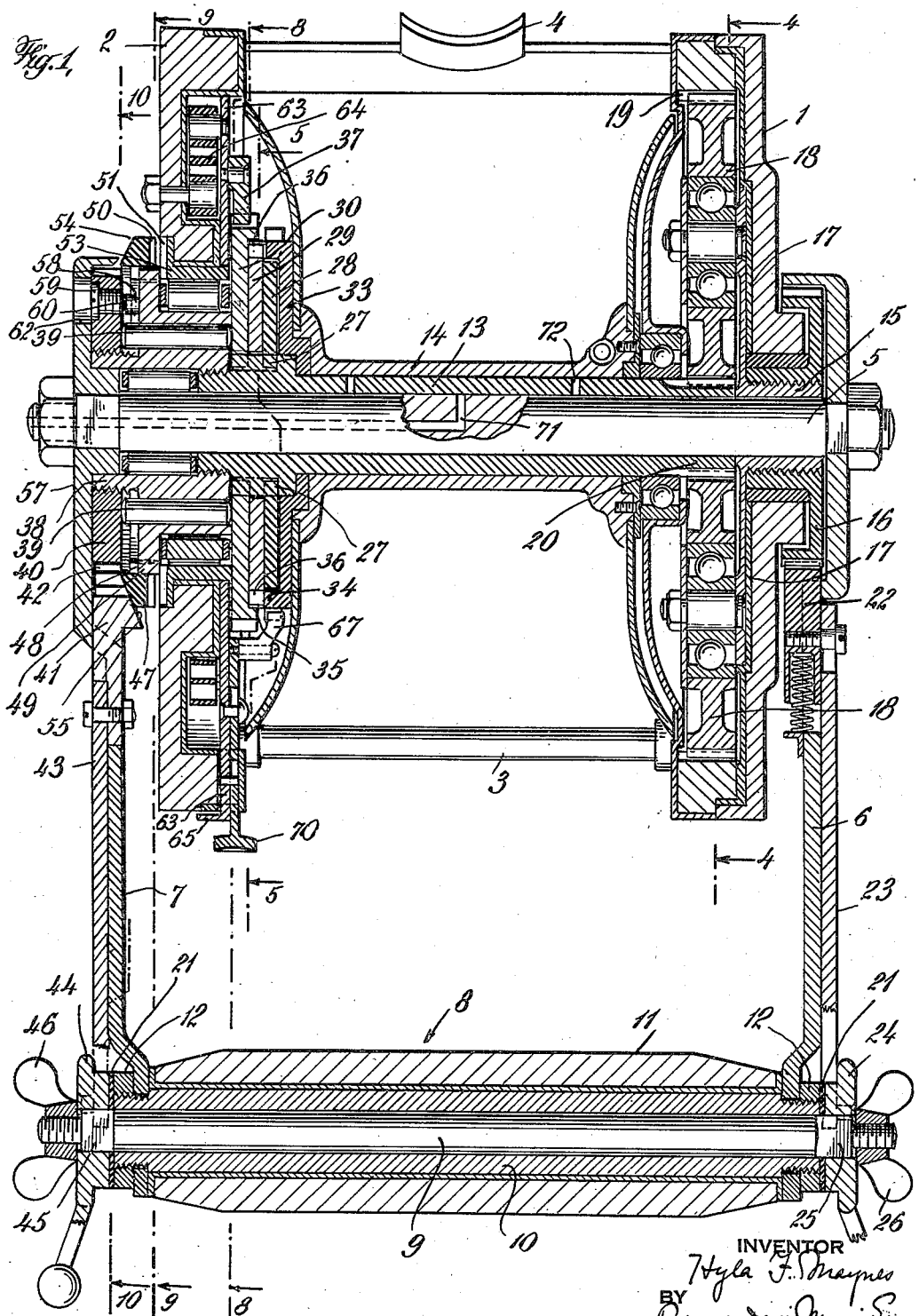

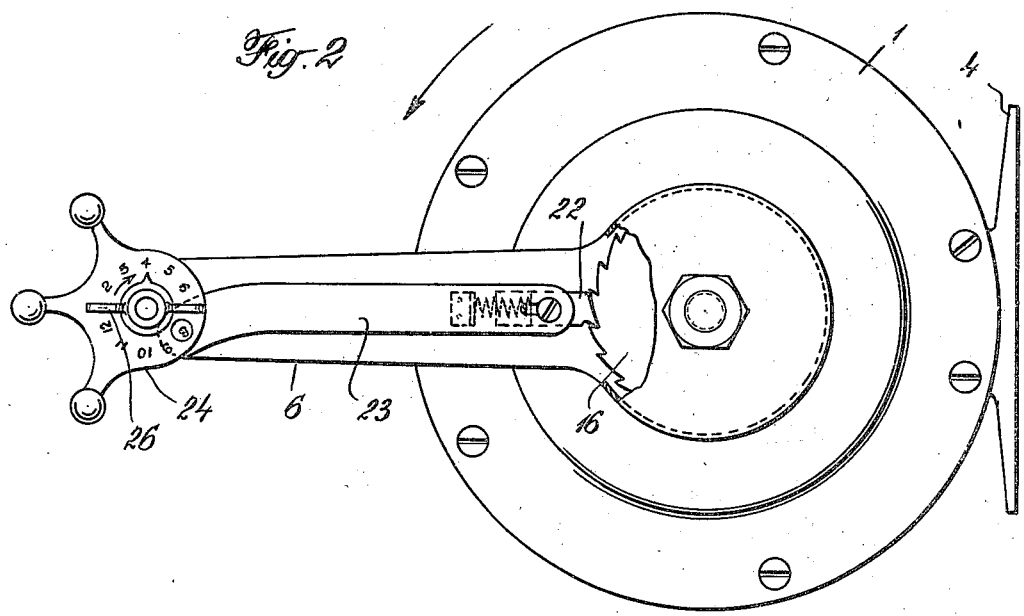
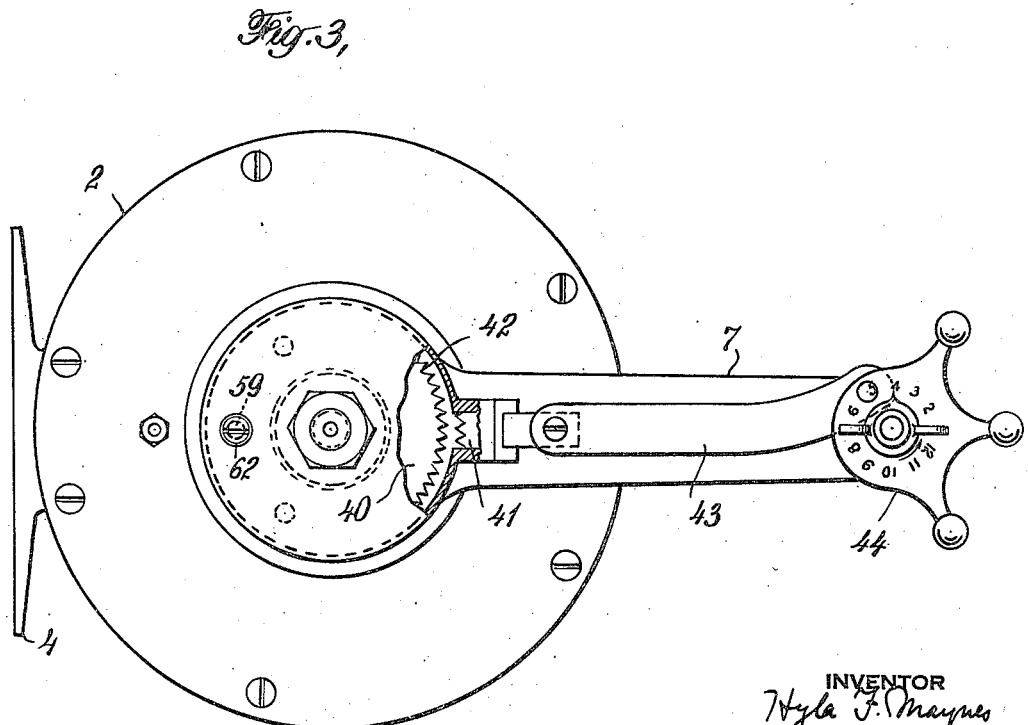

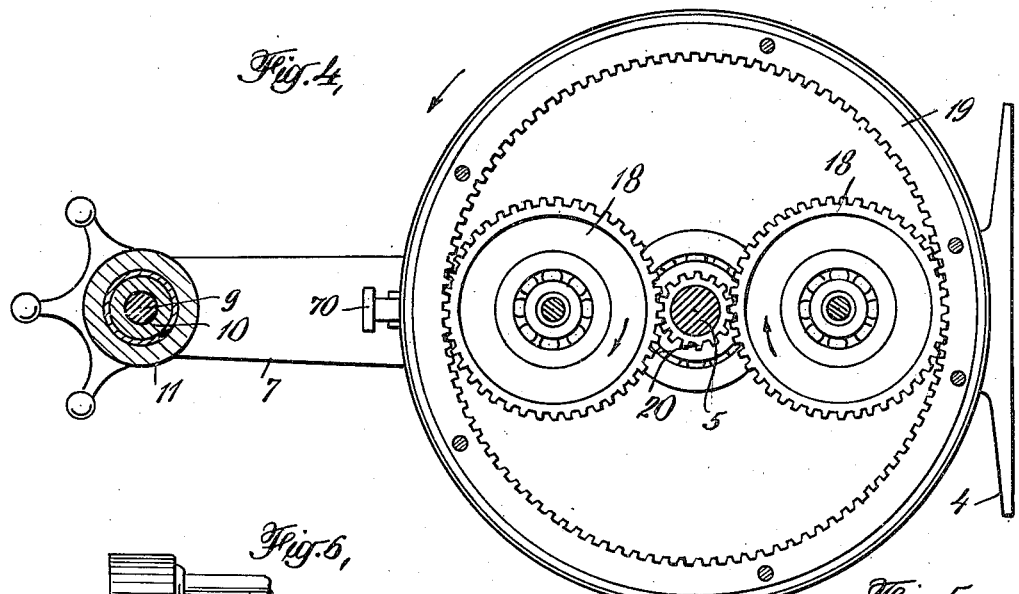
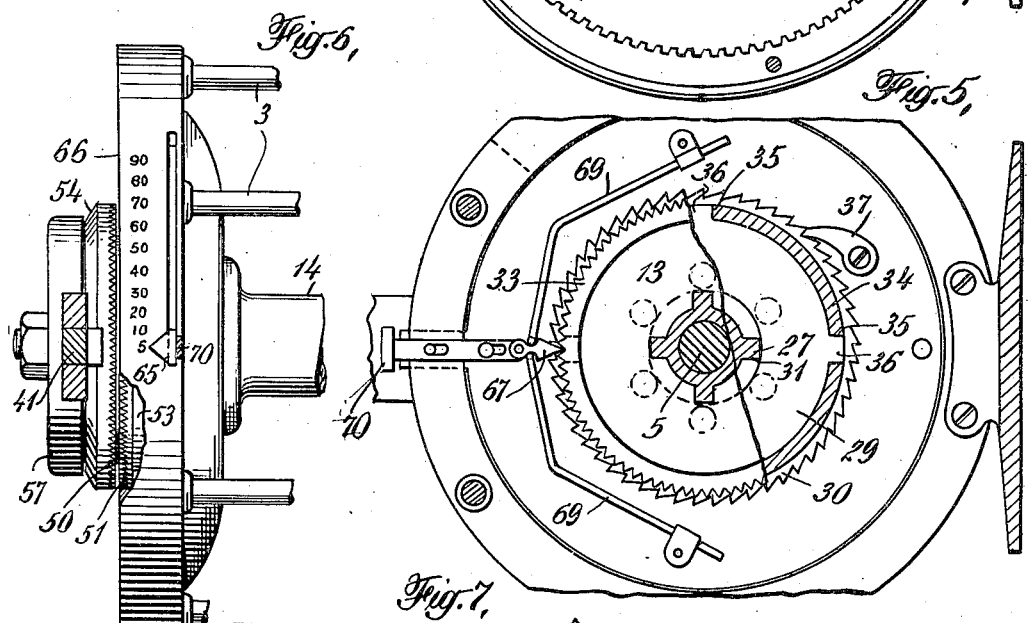
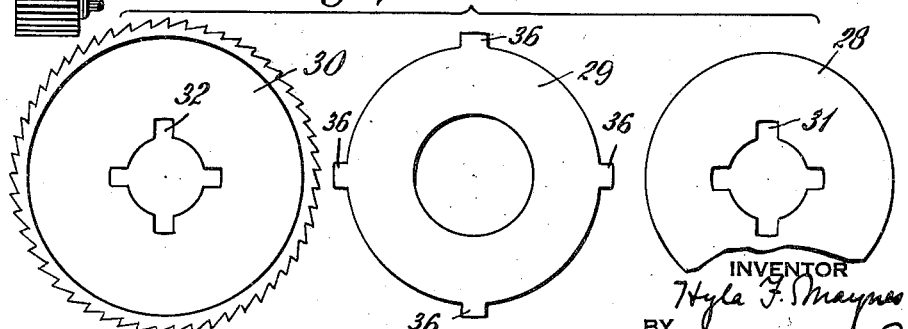

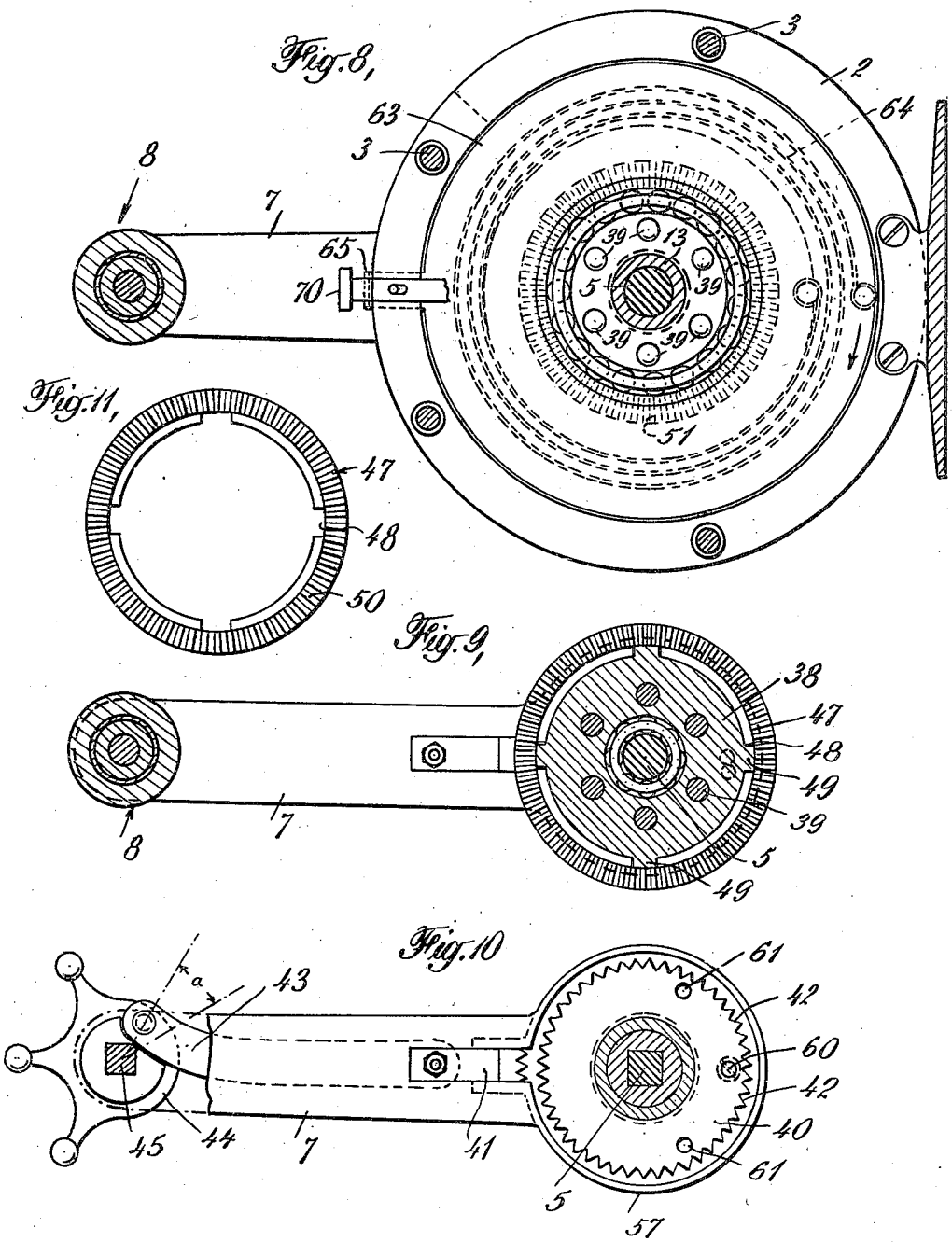

1,905,483

UNITED STATES PATENT OFFICE

HYLA F. MAYNES, OF NORTH TONAWANDA, NEW YORK, ASSIGNOR OF ONE-HALF TO EMMA C. MAYNES, OF NORTH TONAWANDA, NEW YORK

FISHING REEL

Application filed May 20, 1932. Serial No. 612,467.

This invention relates to fishing reels, particularly those reels used in deep-sea fishing for large fish.

The object of the invention is generally to improve upon reels of this type. One specific improvement is the provision of an oscillating crank handle for rotating the spool in reeling-in. This handle is symmetrically located with respect to the pole, thus avoiding twisting during reeling-in, and can be seized with either fist, thus enabling the fisherman to use both hands effectively in supporting the pole and also enabling him to change hands without awkwardness should the pole arm become fatigued. It thus performs two functions—that of the ordinary crank (although more efficiently) and that of an auxiliary hand hold or support for the pole. Other improvements are in the clutch, drag and brake mechanism, the three being simplified and combined, in means for indicating the pull exerted by the fish, in the reeling mechanism and in various other features.

In the accompanying drawings I have illustrated a preferred embodiment of my invention. In these drawings Figure 1 is a transverse section through the reel and its operating crank handle; (this figure is on a somewhat larger scale than the others); Figure 2 is an end elevation looking from the right of Figure 1; Figure 3 is an elevation similar to Figure 2 with parts shown in section, but looking from the left of Figure 1; Figure 4 is a transverse section taken along line 4—4 of Figure 1; Figure 5 is a transverse section taken along line 5—5 of Figure 1; Figure 6 is an elevation of the left-hand end of the reel looking toward the pole; Figure 7 illustrates the three discs which constitute the clutch or drag element of the reel; Figure 8 is a transverse section along line 8—8 of Figure 1; Figure 9 is a transverse section taken along line 9—9 of Figure 1; Figure 10 is a transverse section taken along line 10—10 of Figure 1 and Figure 11 is a detail of the locking collar.

The reel illustrated in these drawings and embodying the present invention comprises a pair of fixed end plates, the gear end plate 1, and the clutch end plate 2 which are connected by pillars 3 forming a frame which is supported upon the pole by means of a foot plate 4. (The tip of the pole would point toward the top of the sheet in Figure 1). Extending axially through the reel is a spindle or rod 5 carrying at its right-hand end the gear crank 6 and at its left-hand end the clutch crank 7. These two cranks carry between them at their outer ends a transverse crank handle 8 through oscillation of which the spool of the reel is rotated. This handle comprises a sleeve 10 to which the ends of the cranks 6 and 7 are rigidly connected by nuts 12 and on which a handle grip 11 is rotatably mounted. Extending through the bore of the sleeve 10 and rotatable therein is a rod 9 the function of which I shall describe later. The spindle 5 extends through the bore of a sleeve 13. The spool 14 is journaled upon this sleeve 13 and freely rotatable thereon when the line is running free, but is clutched to the sleeve 13 during reeling in by a clutch which I shall describe presently.

I shall now describe the mechanism by means of which oscillation of the handle 8 and its cranks 6 and 7 rotate the sleeve 13 and through it the spool 14 which, for the present, we shall assume is clutched to the sleeve 13 and rotates with it. Journaled upon the right-hand end of the spindle 5 is a spider 15 to which is fixed a ratchet drum 16 (see Figures 1 and 2). Extending from the inner end of the spider 15 are two radial arms 17 each of which carries a planetary gear 18 (see Figure 4). Each of these planetary gears meshes with a fixed, internal annular rack 19 carried by the end plate 1 and also with a pinion 20 milled from the right-hand end of the sleeve 13. Thus rotation of the spider 15 causes the planetary gears 18 to revolve about the spindle 5 and while revolving to rotate the sleeve 13. This rotation of the spider 15 carrying its planetary gears is effected through oscillation of crank 6 on which is mounted a spring-pressed pawl 22 which engages the teeth of the ratchet drum 16. This pawl 22 is moved into or out of engagement with the ratchet teeth of the ratchet wheel 16 by means of a pitman 23 which extends along the outer face of the crank 6 and is pivoted to a mutilated star wheel 24 mounted on a square boss 25 at the end of the rod 9. The star wheel is held frictionally against rotation by means of a wing nut 26 on the rod 9 and a friction fibre washer 21 placed between the star wheel and the nut 12. The relative friction can be gauged by means of a scale on the star wheel. A seven to one gear ratio exists among the parts just described so that swinging the handle 8 and the crank 6 through an arc 180° causes the sleeve to make three and one-half complete revolutions.

In describing the operation of the reeling mechanism I have assumed the spool 14 clutched to the sleeve 13 and and a hold-back pawl and ratchet provided to permit the operation of the actuating pawl and ratchet 22—16. I shall now describe the clutch by means of which the spool is made to rotate with the sleeve. The sleeve 13 is provided near its left-hand end with four equi-spaced radial ribs 27 (see Figure 5), upon which are mounted three clutch discs (see Figure 7)— a bronze clutch disc 28, a fiber clutch disc 29 and a combination bronze clutch disc and ratchet 30. Discs 28 and 30 are provided with radial notches 31 and 32 respectively which receive the radial ribs 27 on the sleeve 13 so that these two discs rotate with the sleeve but may have an axial movement relative thereto. The central aperture of the intermediate disc 29, however, is of sufficient diameter to slip over the ribbed end of the sleeve 13 and is not provided with notches for engaging those ribs. The fiber disc 29, therefore, has no direct connection with the sleeve 13. Integral with the left-hand end of the spool 14, and forming a part thereof is a click drum 33 having a peripheral flange 34 which overlies the perimeters of the discs 28 and 29. This flange 34 is provided with four equi-spaced notches 35 into which project four corresponding radial lugs 36 on the fiber disc 29. The fiber disc 29 is thus rotatable with the click drum and spool, but may have axial movement relative thereto. Indirectly mounted on the end plate 2, through means which I shall describe presently, is a hold-back pawl 37 which engages the ratchet teeth on the periphery of the ratchet disc 30. It will be clear from the foregoing that if the clutch discs 28, 29 and 30 are mounted loosely relative to one another rotation of the sleeve 13 will not be transmitted to the spool 14, and the spool can rotate freely on the sleeve 13 as a journal. On the other hand, if pressure is exerted to force these three discs into frictional engagement rotation of the sleeve will be transmitted through disc 28, disc 29 and click drum 33 to the spool causing the latter to rotate with the sleeve, and the spool cannot freely rotate on its journal. It may, however, be reversely rotated by the pull of the fish, when that pull exceeds a predetermined amount, by slipping the clutch. The clutch under these conditions acts as a drag, as I shall describe more fully presently.

I shall now describe the means which I have provided for operating this clutch. Mounted upon the left-hand end of the sleeve 13 and rotatable with it is a head 38 (see Figures 1 and 9) through which extend six longitudinally slidable pins 39, equi-spaced about the axis of the reel. These pins abut at their inner ends against the disc 30 and are engaged at their outer ends by a clutch-adjusting nut 40 threadedly mounted on the outer end of the head 38 (the threads are left-handed threads). Thus, by screwing the nut 40 inward the pins 39 are forced against the disc 30, move it inward, and so clamp the intermediate fiber disc 29 between the outer discs 28 and 30. The adjusting nut 40 is turned by means of a double-acting pawl 41 mounted upon the crank 7 (see Figures 3 and 10) and engaging similar double-acting ratchet teeth 42 on the periphery of the nut. This pawl 41 is moved into and out of engagement with teeth 42 by means of a pivoted pitman 43 lying upon the outer face of the crank 7 and pivoted at its outer end to a mutilated star wheel 44 mounted upon a square boss 45 at the left-hand end of the rod 9. Like the companion star wheel 24 at the right hand end of the rod 9, the star wheel 44 is frictionally held by means of a wing nut 46 and a friction fiber washer placed interposed between it and the nut 12 at the left hand end of the handle. It is necessary, of course, to hold the head 38 fixed relative to the end plate 2 in order to turn the adjusting nut, and this I do by means of a locking collar 47 (see Figures 1, 9 and 11) mounted on and longitudinally movable with reference to the head 38 by means of notches 48 on the collar which receive radial ribs 49 on the head. The collar is thus free to move axially of the head, but cannot rotate on it. The inner face of the collar 47 is provided with double-acting ratchet teeth 50 which engage similar teeth 51 on a corresponding locking collar 53 fixed upon the end plate 2. The outer face of the collar 47 is provided with a conical bevel 54 which engages a corresponding bevel 55 on the inner face of the pawl 41. Thus, as the pawl 41 is moved radially inward to engage the nut 40 the collar 47 is moved inward axially of the reel to engage the locking collar 53 and prevent rotation of the head during the nut-adjusting movement of the crank handle.

I shall now describe the mechanism which I have provided for indicating at any time the pull exerted by the fish upon the line. Journaled on an inward extension of the end plate locking collar 53 is an indicator plate 63 on which is mounted the hold-back pawl 37, described above, and the indicator plate 63 is connected to the end-plate 2 through a stiff coil spring 64. Thus, pull on the spool, acting through the clutch members, including ratchet disc 30 and pawl 37, exerts a torque on the plate 63 which rotates slightly against the counter torque of the spiral spring 64. The amount of this torque is indicated by a pointer 65 (see Figure 6) carried by the indicator plate and movable over a scale 66 on the periphery of the end plate 2. This scale is calibrated in pounds pull.

The two star wheels 24 and 44, each being fixed to the rod 9, move together so that either can be turned to effect a desired adjustment and either hand employed for the purpose. A forward movement (toward the tip of the pole) of the points of the star wheels draws pawl 22 out of operative engagement with ratchet 16 and advances pawl 41 into operative engagement with adjusting nut 40. (Compare Figures 2 and 3). There is an intermediate neutral point, however, when both pawls are in inoperative positions and the handle free to oscillate without effect.

The reel is operated as follows: Let us assume that the fisherman has a fish line that will break at fifty pounds breaking test and that he has decided to fish for a time with the drag or clutch set to slip at forty pounds pull on the line. Before any line is let out wing nut 26 or 46 is adjusted to exert a pressure on washers 21 corresponding to the desired tension. The scales on the outer faces of the star wheels assist in determining this pressure. With the handle drawn back toward the butt of the pole, the star wheels are turned forward against the frictional pressure of the wing nuts, to move pawl 41 into engagement with teeth 42 of adjusting nut 40 and to disengage pawl 22. The handle is then swung towards the tip of the pole, turning nut 40 and increasing the pressure among the clutch discs (nut 40 has left-handed threads). When the predetermined pressure has been attained further forward movement of the handle will disengage pawl 41, the star wheels slipping under the thrust of pitman 43. The star wheels are then turned back to advance the ratchet pawl 22 into operative position for reeling in. The fisherman then pulls on the line and watches indicator 65. If the clutch slips at an indicated pull of forty pounds the correct adjustment has been made. If it slips at some other pull further manipulation of either nut 46 or 26 will be necessary to affect nut 40.

The desired adjustment of the clutch or drag having been made the reel is now ready for fishing. To let the line out the handle is swung toward the tip of the pole, the star wheels rotated forward to engage pawl 41 with nut 40 and locking collar 47 with collar 53, and then the handle is swung back toward the butt of the pole. This releases the clutch and leaves the spool free to unwind. If the line is playing out too fast the fisherman simply swings the handle toward the tip of the pole and uses as much of a drag as he wishes. Should he get a strike, as the line is being paid out he swings the handle towards the tip of the pole until the torque resistance of nut 40 disengages pawl 41; the star wheels are then rotated to throw pawl 22 into operative position; and the fish can be reeled in.

Assuming the fisherman seated in a deck chair with the butt end of the pole in a socket fastened on the seat of the chair, reeling in is accomplished as follows: The fisherman grips the pole beyond the reel with one fist, seizes the grip 11 with the other fist and oscillates the crank handle. This oscillating movement acting through the ratchets, the planetary gearing and the clutch causes both the sleeve 13 and the spool 14 to rotate to reel the line in. The inward swing of the crank handle rotates the spool; the outward swing is the free swing. If, during the reeling-in the fish starts to run out and exerts a pull of more than forty pounds the clutch will slip and act as a drag, thereby preventing breakage of the line.

As is usual in deep-sea fishing a period of reeling-in will be alternated with a period of so-called "pumping" during which time the fisherman swings his pole up to take in several feet of line which is subsequently reeled in when the pole is lowered. During this pumping operation both hands can be effectively employed, not only the hand grasping the pole, but the hand grasping the crank handle. This greatly relieves the strain usually imposed upon the pole arm. And as this reel is neither right-handed nor left-handed the fisherman can quickly reverse hands at any time and so lessen the fatigue which results when one hand always hold the pole and the other the crank handle. Furthermore, my handle grip is located symmetrically with reference to the pole so that the operating pull is in the plane of the pole and there is no twisting of the reel, and hence no additional exertion required by the pole hand to keep the pole from twisting or turning as is the case with ordinary reels.

Reels for salt-water fishing are commonly provided with a brake or emergency drag used when the fish is running out, and quite independent of the star wheel drag used when reeling in. Because of the powerful braking effect secured by my combination clutch and drag, a separate brake is unnecessary. Thus, with a single control, the star wheel 44 or star wheel 24 and cranks 6 and 7, using either hand, I manipulate clutch, drag, brake and reel, and assist the pole hand in supporting the pole while holding, pumping or reeling in.

A cover plate 57 forming an extension of the crank 7 overlies the nut 40. In order to limit the outward travel of the nut 40 and thus prevent its jamming against the plate 57 I provide the outer face of the head 38 with a stop pin 58, and the nut 40 with a screw 59 which carries a corresponding stop pin 60 which engages the stop pin 58 when the nut 40 has been moved outward to its predetermined limiting position. Should an attempt be made to swing the handle beyond the limiting position defined by these pins the pawl 41 will disengage the nut 40. As the clutch discs wear, it may be necessary from time to time to change the adjustment of these stops and for this purpose I have provided a plurality of screw holes 61 in the nut 40 into any one of which the screw 59 may be fitted, access to these holes being had through an opening 62 in the cover plate 57.

In Figures 1 and 5 I have illustrated the conventional click which is commonly employed in fishing reels. This mechanism comprises a pivoted click tongue 67 which engages double-acting ratchet teeth 68 on the periphery of the click drum 33. When in operation the click tongue is resiliently held by means of two springs 69. The tongue may be moved into and out of operative position by means of a sliding button 70.

Ball and roller bearings are provided as illustrated and oil is fed to the spindle 5 and sleeve 13 through oil holes 71 and 72 (see Figure 1).

I claim:

1. In a fishing reel, a spool, means for mounting the spool on a pole a crank mounted to swing about the axis of the spool and extending across the pole, and means interposed between the crank and the spool for transmitting movement of the handle to the spool for rotating the spool.

2. In a fishing reel, a spool, means for mounting the spool on a pole, a crank mounted to swing about the axis of the spool for rotating the spool and a handle on the crank extending across the pole for swinging the crank and supporting the pole.

3. In a fishing reel, a spool, means for mounting the spool on a pole, a swinging crank for rotating the spool and a transverse crank handle symmetrically mounted with respect to the pole for swinging the crank and acting as a hand hold for supporting the pole.

4. In a fishing reel, a spool, means for mounting the spool on a pole, a journal about which the spool rotates, a crank mounted to swing about the journal axis to rotate the spool, and a handle on the crank extending across the pole whereby the pull on the handle is exerted in the plane of the pole.

5. In a fishing reel, a spool, a ratchet for rotating the spool, a crank swinging about the axis of the spool having a handle extending across the pole and a pawl carried by the crank for engaging the ratchet to rotate the spool.

6. In a fishing reel, a pair of end plates, a spool mounted for rotation between them, means for mounting the spool transversely on a pole, a crank on either end plate and swingable about the axis of the spool, a ratchet for rotating the spool, a pawl carried by one of the cranks for operating the ratchet and a handle connecting the cranks serving to rotate the spool and as an auxiliary hand hold for the pole.

7. In a fishing reel, a spool, a journal on which the spool is mounted, a swinging crank at one end of the spool for rotating the journal, a friction clutch for clutching the spool to the journal, a swinging crank at the other end of the spool, means actuated by the swinging of said second crank for controlling the pressure between the clutch elements and hence the counter line pull at which the spool will slip on the journal, and a transverse handle connecting the two cranks.

8. In a fishing reel, a spindle, a sleeve on the spindle, a spool journaled on the sleeve, a swinging crank at one end of the spindle for rotating the sleeve, a friction clutch adjacent the other end of the sleeve through which rotation of the sleeve is imparted to the spool, the clutch comprising two friction discs, one rotatable with the sleeve and one with the spool, a nut mounted on the sleeve the turning of which varies the pressure between the two clutch discs and thus controls the counter pull on the line under which the spool will slip on the sleeve, a swinging crank on the clutch end of the spindle, a pawl carried thereby for gripping the nut whereby swinging of the crank turns the nut, and a transverse handle connecting the two cranks.

9. In a fishing reel, a sleeve, a spool journaled on the sleeve, a clutch disc rotatable with the sleeve, a clutch disc rotatable with the spool, means for rotating the sleeve, a clutch-adjusting nut on the sleeve, a crank for turning the nut, a pawl carried by the crank for engaging the nut, and means for holding the pawl in operative engagement with the nut only until the nut has been turned to apply a predetermined pressure against the clutch discs.

10. In a fishing reel, fixed end plates, a spool journaled between the end plates, means for rotating the spool to reel the line in, and means resisting counter-rotation of the spool under line pull comprising a spring having on end attached to an end plate and interposed between the spool and said end plate which flexes in proportion to the pull on the line.

11. In a fishing reel, fixed end plates, a spool journaled between the end plates, means for rotating the spool to reel the line in, a friction clutch for transmitting rotation to the spool, means resisting counter-rotation of the spool under line pull comprising a spring having one end attached to an end plate and interposed between the spool and said end plate which flexes in proportion to the pull on the line, and means for adjusting the clutch to slip and act as a drag when the line pull has reached a predetermined magnitude.

12. In a fishing reel, fixed end plates, a spool rotatable between the end plates, a ratchet rotatable with the spool, a crank for rotating the spool, a pawl carried by the crank for engaging the ratchet, a hold-back ratchet rotatable with the spool, a hold-back pawl for engaging the hold-back ratchet and a spring interposed between the hold-back pawl and an end-plate the flexure of which measures the pull on the line.

13. In a fishing reel, fixed end plates, a spool journaled between the end plates, means for rotating the spool in one direction, a ratchet on the spool, a pawl on an end plate engaging the ratchet for holding the spool against reverse rotation under line pull, and a spring interposed between the end plate and the pawl which flexes in proportion to the line pull, and means for indicating such flexure.

14. In a fishing reel, fixed end plates, a spool, a journal mounted for rotation between the end plates, a spool on the journal, means for rotating the journal, a clutch disc rotatable with the spool, a clutch disc rotatable with the journal, a ratchet on the journal disc, a pawl engaging the ratchet for holding the spool against counter-rotation under line pull, a spring interposed between the pawl and an end plate the flexure of which indicates the line pull, and means for moving the clutch discs into frictional engagement whereby the spool rotates with the journal, but slips when the spring registers a predetermined line pull.

15. In a fishing reel, a sleeve, a spool journaled on the sleeve, a clutch disc rotatable with the sleeve, a clutch disc rotatable with the spool, means for rotating the sleeve, a clutch-adjusting nut on the sleeve, a crank for turning the nut, a pawl carried by the crank for engaging the nut, a star wheel on the crank for moving the pawl into operative engagement with the nut, and means for frictionally holding the star wheel until the nut has been turned to apply a predetermined pressure against the clutch discs.

16. In a fishing reel, a sleeve, a spool journaled on the sleeve, a clutch disc rotatable with the sleeve, a clutch disc rotatable with the spool, means for rotating the sleeve, a clutch-adjusting nut on the sleeve, a crank for turning the nut, a pawl carried by the crank for engaging the nut, a star wheel on the crank for moving the pawl into operative engagement with the nut, cooperating stops on sleeve and nut limiting the outward travel of the nut, and means for frictionally holding the star wheel until the nut has been turned to stop-engaging position.

17. In a fishing reel, a spool, a journal on which the spool is mounted, a ratchet rotatable with the journal, a swinging crank for rotating the journal, a pawl carried by the crank for engaging the ratchet, a friction clutch for clutching the spool to the journal, a nut on the journal for controlling the pressure between the clutch elements, a swinging crank for turning the nut, a pawl carried by the crank for engaging the nut, a transverse handle connecting the two cranks, and means on each end of the handle for actuating the pawls.

18. In a fishing reel, two connected end plates, means for mounting them transversely on a pole, a spindle extending axially between the end plates, a sleeve on the spindle, a ratchet journaled on one end of the spindle, planetary gears carried by the ratchet and meshing with an internal annular rack on the adjacent end plate and a pinion on the sleeve, an oscillatable crank on the spindle, a pawl carried by the crank to rotate the ratchet and the sleeve, a spool journaled on the sleeve, two clutch discs, one rotatable with the sleeve and one rotatable with the spool, an adjusting nut on the sleeve for varying the frictional pressure between the clutch discs, an oscillatable crank for turning the adjusting nut, a pawl carried by the crank for engaging the nut, means for causing the pawl to disengage the nut when a predetermined pressure has been applied, a hold-back ratchet on the sleeve clutch disc, a pawl engaging the hold-back ratchet, a spring interposed between the pawl and the adjacent end plate, which flexes in proportion to the pull on the line, means for indicating that pull, and a handle connecting the two cranks for oscillating them and acting as an auxiliary hand hold for the pole.

19. In a fishing reel, a frame, means for mounting the frame on a pole, a journal rotatably mounted in the frame, a spool mounted for rotation on the journal, a clutch disc rotatable with the journal, a clutch disc rotatable with the spool, means for rotating the journal, a clutch-adjusting nut on the journal, a crank for turning the nut, means for transmitting the pressure of the nut to the clutch discs, and means for locking the journal to the frame to prevent rotation while the adjusting nut is being turned.

20. In a fishing reel, a pair of end plates, a rod extending transversely of the end plates, a spool mounted for rotation between the end plates, means for mounting the reel transversely on a pole, a crank mounted on either end of the rod beyond the end plates, a handle connecting the cranks and serving as an auxiliary hand hold for the pole and through which the swinging of the handle rotates the spool.

21. In a fishing reel, a spool, means for mounting the spool on a pole and a handle extending across the pole connected through a crank arm to means for rotating the spool, the handle being mounted to oscillate through an arc of approximately 180° while in operative connection with the spool so as to reel the line thereon, and serving as an auxiliary hand hold for the pole.

22. In a fishing reel, a pair of end plates, a rotatable journal extending between them, a spool mounted for rotation upon the journal, a swinging crank on one end plate for rotating the journal, a friction clutch adjacent the other end plate through which rotation of the journal is imparted to the spool, a nut mounted on the journal for varying the pressure between the clutch elements and hence the counter line pull under which the spool will slip on the journal, a second swinging crank on the clutch end plate, a pawl carried thereby for gripping the nut whereby swinging of the crank turns the nut, and a transverse handle connecting the two cranks.

23. In a fishing reel, a spool, a journal on which the spool is mounted, means for mounting the spool transversely on a pole, a ratchet rotatably connected with the journal, a swinging crank at one end of the spool, a pawl for cooperating with said ratchet carried by the crank and so arranged that the journal is rotated as the crank is swung toward the foot of the pole, a friction clutch for clutching the spool to the journal, a clutch adjusting nut on the journal, a pawl carried by a second crank for engaging the nut, the nut being so mounted on the journal that as the second crank is swung toward the tip of the pole friction between the clutch elements is increased and is decreased as the second crank is swung back, and a handle connecting the two cranks.

24. In a fishing reel, a pair of fixed end plates, a journal mounted for rotation between the end plates, a spool mounted for rotation on the journal, means for rotating the journal, a friction clutch for clutching the spool to the journal, a clutch-adjusting nut on the journal, double-acting ratchet teeth on the nut, a crank for turning the nut, a pawl having double-acting teeth carried by the crank and means for locking the journal against rotation relative to an end plate when the pawl is moved into engagement with the clutch-adjusting nut.

25. In a fishing reel, a pair of fixed end plates, a journal mounted for rotation between the end plates, a spool mounted for rotation on the journal, means for rotating the journal, a friction clutch for clutching the spool to the journal, a clutch-adjusting nut on the journal, double-acting ratchet teeth on the nut, a crank for turning the nut, a pawl having double-acting teeth carried by the crank, a collar rotatable with the journal but movable axially thereof, double-acting teeth on the collar engageable with similar fixed teeth on an end plate and means on the pawl for moving the collar into interlocking engagement with the end plate when the pawl is moving into engagement with the clutch-adjusting nut.

26. In a fishing reel, a spool, a journal on which the spool is mounted, a ratchet rotatable with a journal, a swinging crank for rotating the journal, a pawl carried by the crank for engaging the ratchet, a friction clutch for clutching the spool to the journal, a nut on the journal for controlling the pressure between the clutch elements, a second swinging crank for turning the nut, a pawl carried by the second crank for engaging the nut, a transverse handle connecting the two cranks, a rotatable rod carried by the handle, connections between the rod and the pawls so arranged that as the rod is turned one pawl is moved into engagement with its ratchet and the other is moved out of engagement, and means on the end of the rod for turning it.

In testimony whereof I affix my signature.

HYLA F. MAYNES.